(12) United States Patent  
Larock

(10) Patent No.: US 8,726,550 B1  
(45) Date of Patent: May 20, 2014

(54) APPARATUS FOR HOLDING AND DISPLAYING AN AERONAUTICAL CHART OR OTHER TYPE OF MAP

(76) Inventor: Jason Mathew Larock, Cameron Park, CA (US)

(*) Notice: Subject to any disclaimer, the term of this patent is extended or adjusted under 35 U.S.C. 154(b) by 94 days.

(21) Appl. No.: 13/448,521

(22) Filed: Apr. 17, 2012

(51) Int. Cl.
  *G09F 11/18* (2006.01)
  *G09F 11/29* (2006.01)
(52) U.S. Cl.
  CPC .................................... *G09F 11/29* (2013.01)
  USPC ............................................................ 40/518
(58) Field of Classification Search
  USPC .......... 40/519; 248/579, 618, 330.1; 403/243, 403/252, 254
  See application file for complete search history.

(56) References Cited

U.S. PATENT DOCUMENTS

| | | | | |
|---|---|---|---|---|
| 1,741,676 A | * | 12/1929 | Borel | 40/483 |
| 2,485,802 A | * | 10/1949 | Asachika | 40/518 |
| 2,761,413 A | * | 9/1956 | Breer | 116/204 |
| 2,853,817 A | * | 9/1958 | Palm | 40/518 |
| 3,003,270 A | * | 10/1961 | Palm | 40/518 |
| 3,325,933 A | * | 6/1967 | Rizzo et al. | 40/518 |
| 4,800,662 A | * | 1/1989 | Belrose | 40/426 |
| 4,959,916 A | * | 10/1990 | Cochrane | 40/603 |

* cited by examiner

*Primary Examiner* — Kristina Junge
(74) *Attorney, Agent, or Firm* — Thomas R. Lampe

(57) ABSTRACT

Apparatus for holding and displaying an aeronautical chart or other type of map includes an elongated base member having two elongated map support members extending from and rotatably attached to the elongated base member. The apparatus also includes a magnetic positioner and a scale/ruler releasably connected to the base member and used with a chart or map when removed therefrom.

17 Claims, 5 Drawing Sheets

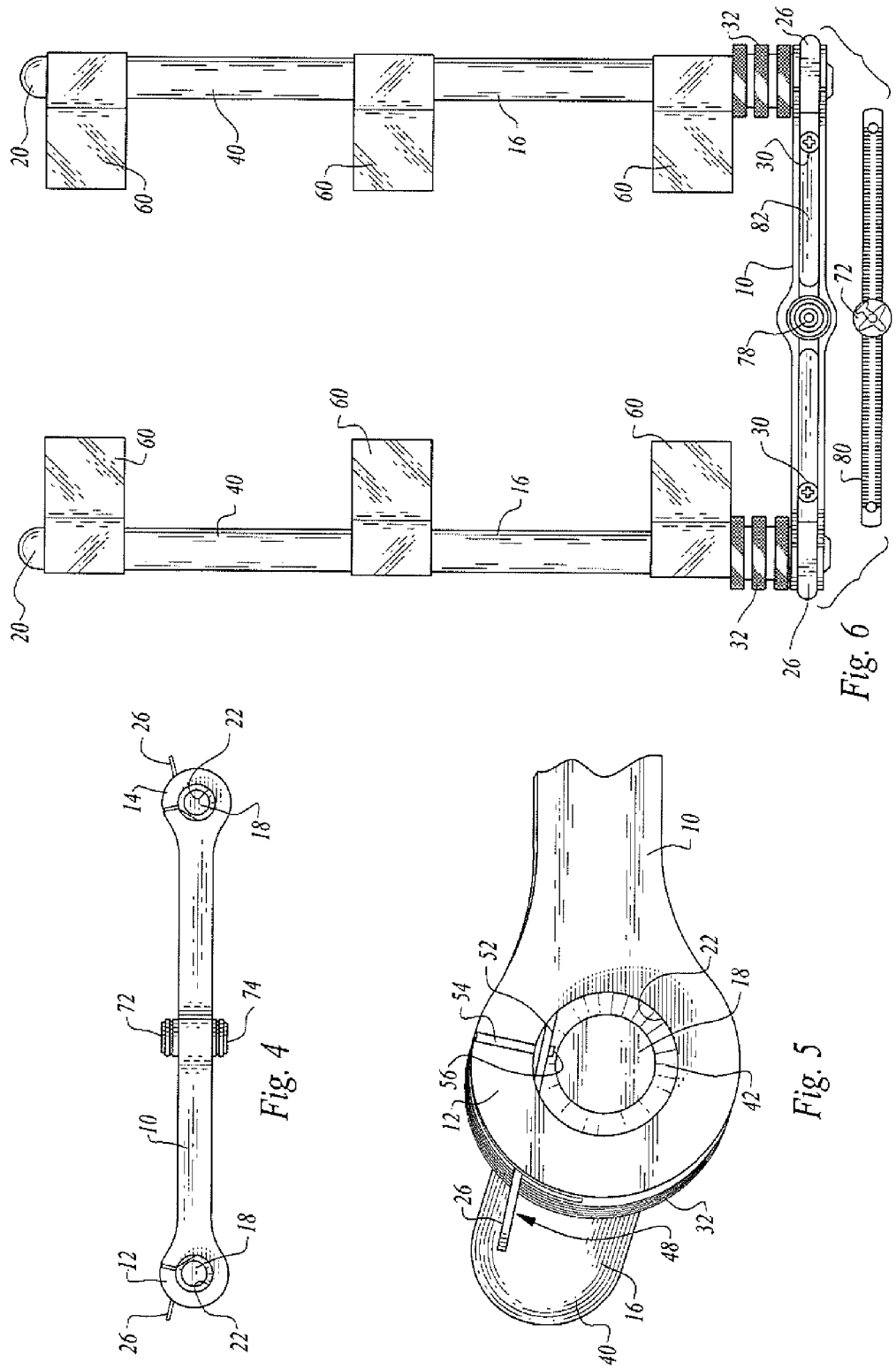

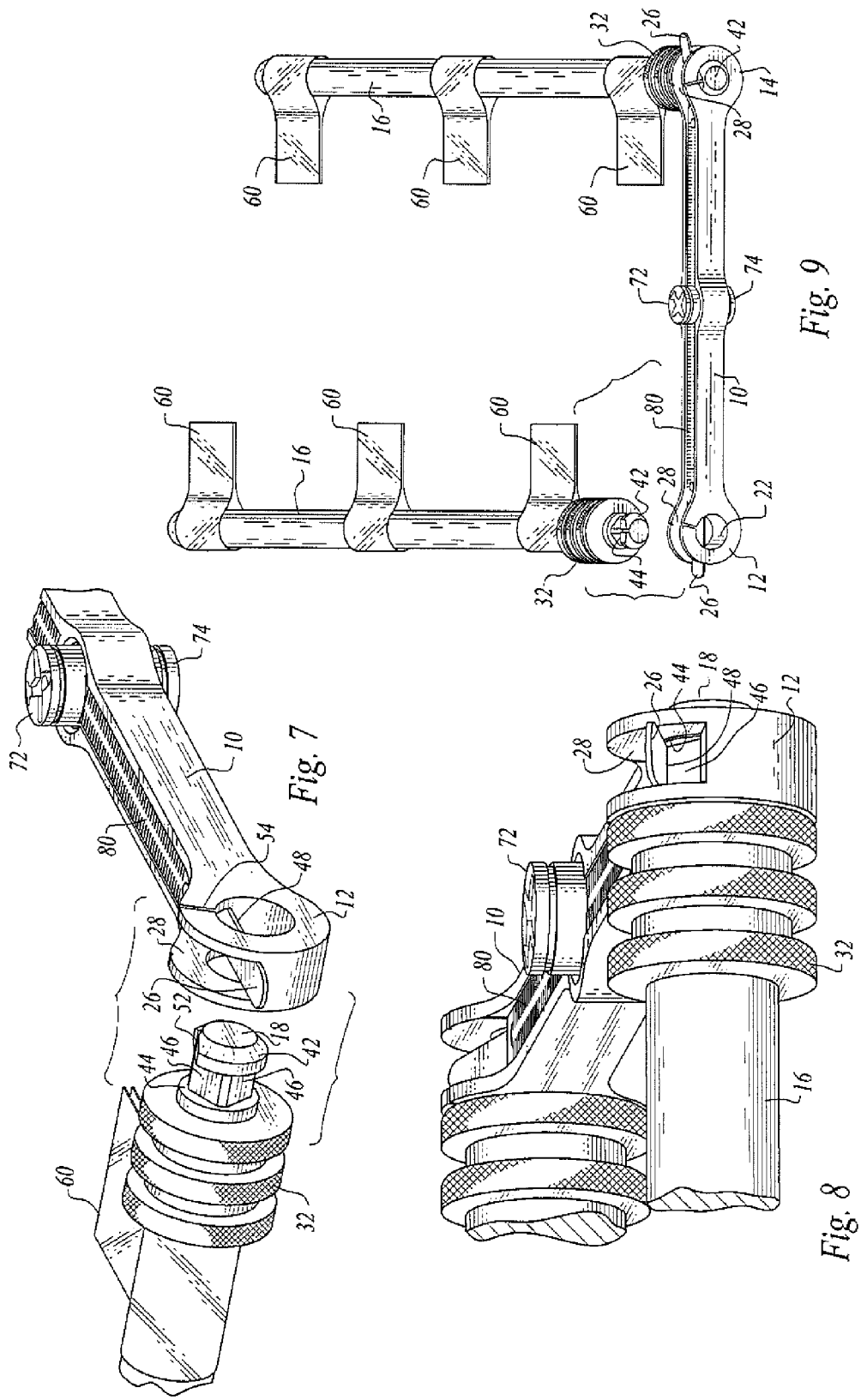

APPARATUS FOR HOLDING AND DISPLAYING AN AERONAUTICAL CHART OR OTHER TYPE OF MAP

TECHNICAL FIELD

This invention relates to an apparatus which is hand-held and for the purpose of supporting an aeronautical chart or other type of map, such as a road map.

BACKGROUND OF THE INVENTION

Printed aeronautical charts are often rather large and unwieldy. Using such charts within the confines of an aircraft cockpit can be difficult. The same problem exists regarding use of road maps in an automobile.

DISCLOSURE OF INVENTION

The present invention relates to apparatus for holding and displaying an aeronautical chart or other type of map, the apparatus employing a number of unique features which enable the aeronautical chart or map to be maintained in a compact configuration with the area of the map of particular interest displayed. A user can employ the apparatus to scroll the map, mark current location, chart a course and measure distances. Components of the apparatus may be used to retain and store particular charts and maps and replace them with others.

The apparatus includes an elongated base member having spaced first and second base member ends, each of the first and second base member ends defining a hole.

The apparatus further includes a double-ended, elongated first map support having a proximal end and a free distal end, the proximal end of the first map support positioned in the hole defined by the first base member end. The first map support extends away from the base member and the free distal end thereof is spaced from the base member. The first map support is rotatable relative to the base member.

First retainer structure is provided for releasably retaining the proximal end of the first map support in the hole defined by the first base member end.

The apparatus also incorporates a double-ended, elongated second map support member having a proximal end and a free distal end. The proximal end of the second map support is positioned in the hole defined by the second base member end. The second map support extends away from the base member and the free distal end thereof is spaced from the base member. The second map support is rotatable relative to the base member.

Second retainer structure is provided for releasably retaining the proximal end of the second map support in the hole defined by the second base member end. The first and second support members are substantially parallel and independently manually rotatable.

Other features, advantages and objects of the present invention will become apparent with reference to the following description and accompanying drawings.

BRIEF DESCRIPTION OF DRAWINGS

FIG. 4 is a front, elevation view of the apparatus;

FIG. 5 is an enlarged, perspective view illustrating a base member end, a portion of a map support and a tension spring, the map support and base member end having aligned indicia;

FIG. 6 is a top, plan view of the apparatus showing adhesive coated connector elements attached to the map supports and a detachable magnetic positioner and scale/ruler removed from the elongated base member;

FIG. 7 is an enlarged, perspective view illustrating portions of the base member and a map support of the apparatus prior to interconnection thereof;

FIG. 8 is an enlarged, perspective view illustrating the map support attached to a base member end;

FIG. 9 is a perspective view illustrating one map support attached to one end of the base member and a second map support removed from the other base member end, adhesive coated connector elements attached to the map supports;

BEST MODE FOR CARRYING OUT THE INVENTION

Figure 1:
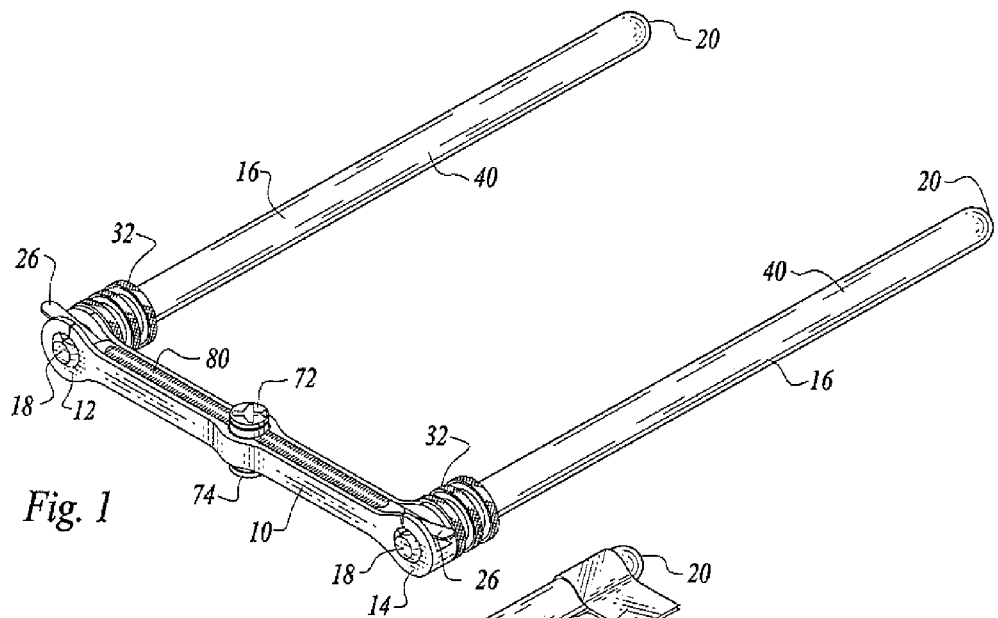
FIG. 1 is a perspective view of apparatus constructed in accordance with the teachings of the present invention prior to attachment of adhesive coated connector elements to map supports of the apparatus.
Figure 2:
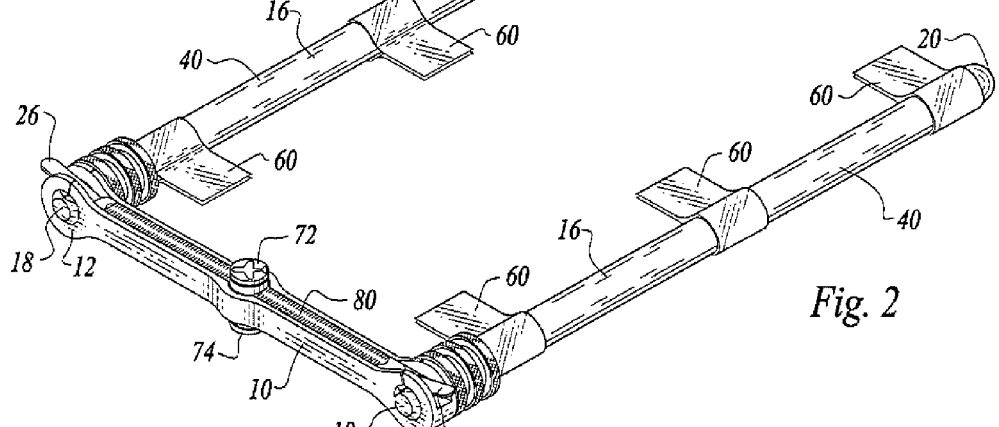
FIG. 2 is a view similar to FIG. 1, but illustrating adhesive coated connector elements attached to the map supports of the apparatus.

Referring to the drawings, apparatus for holding and displaying an aeronautical chart or other type of map constructed in accordance with the teachings of the present invention includes an elongated base member 10 having spaced first and second base member ends 12, 14. Each of the base member ends defines a hole 22.

The apparatus includes two double-ended, elongated map supports 16 having a proximal end 18 and a distal end 20. The proximal ends 18 of the map supports are located in holes 22 extending through base member ends 12, 14.

The map supports 16 extend away from the base member and the free distal ends thereof are spaced from the base member. The map supports 16 are rotatable relative to the base member.

Retainer structure is provided for releasably retaining the proximal ends of the map supports in the holes defined by the base member ends. More particularly, the retainer structure is in the form of tension springs 26. Tension springs 26 are located in spaces 28 defined by the base member ends 12, 14. The tension springs 26 are secured to the base member by screws 30. The springs project outwardly from the base member ends as shown, enabling the springs 26 to be manually engaged and bent upwardly.

The flexible springs 26 are frictionally engageable with the map supports 16 to resist rotation of the map supports.

Rotation of the map supports is accomplished by manually engageable knobs 32, which may be knurled and are suitably formed, for example, of Nylatron MD or other wear resistant material, attached to the map supports.

The map supports include flexible plastic support rods 40 and attached spindle end portions 42, the latter suitably integrally formed with the knobs of Nylatron MD material and entering holes 22 of the base member ends.

The spindle end portions 42 have peripherally extending channels 44 receiving tension springs 26. The spindle end portions have a plurality of flat peripheral surfaces 46 at the channels engageable by the tension springs. The tension springs have flat surfaces 48 which serially engage the flat peripheral surfaces 46 of the spindle end portions as the map supports rotate. This structure is shown, for example, in FIGS. 7 and 8. FIG. 7 illustrates the leading chamfer (angled) edge of the spindle end portion 42, which due to force exerted by a user, will cause the tension spring to lift when engaged by the spindle moving into the base member end.

It will be noted that the spindle end portions are cut away to provide a flat area 52. When the flat area 52 is oriented as shown in FIG. 7 the spindle can be quickly inserted by force since the chamfer and the flat area on the spindle end portion cooperate to lift the spring. If desired, the user can lift the spring by finger to accomplish this task without having the chamfer and flat area of the spindle end portion at the orientation shown in FIG. 7.

FIG. 8 shows the spindle end portion in place in base member end 12 and the tension spring associated with that base member end engaging one of the flat peripheral surfaces in the channel 44 of the spindle end portion. Alignment marks 54, 56 are respectively formed on the base member and the distal end of the map support to indicate when the flat area 52 aligns with the flat surface 48 of the spring 26. The spindle end portion is readily disengageable from the base member during alignment of the flat area 52 and the spring flat surface 48.

The springs 26 not only cooperate with the map supports to resist rotation thereof, but also serve to retain the proximal ends of the map supports in the holes defined by the base member ends. The screws 30 which fasten the tension springs into position readily can be removed by the user. The tension springs can then be flipped over to effectively reactivate/recharge the spring tension.

Figure 10:
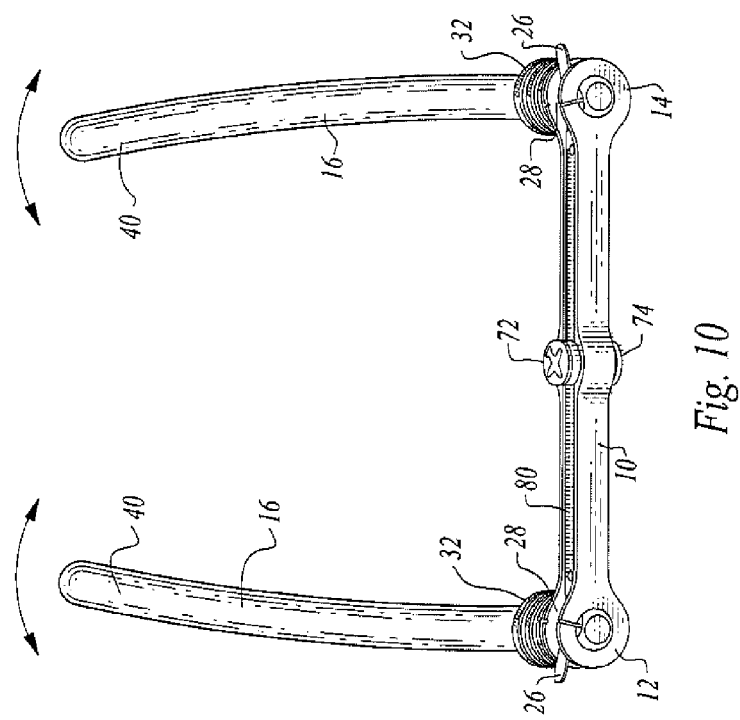
FIG. 10 illustrates the two map supports attached to the base member of the invention and flexed.
Figure 13:
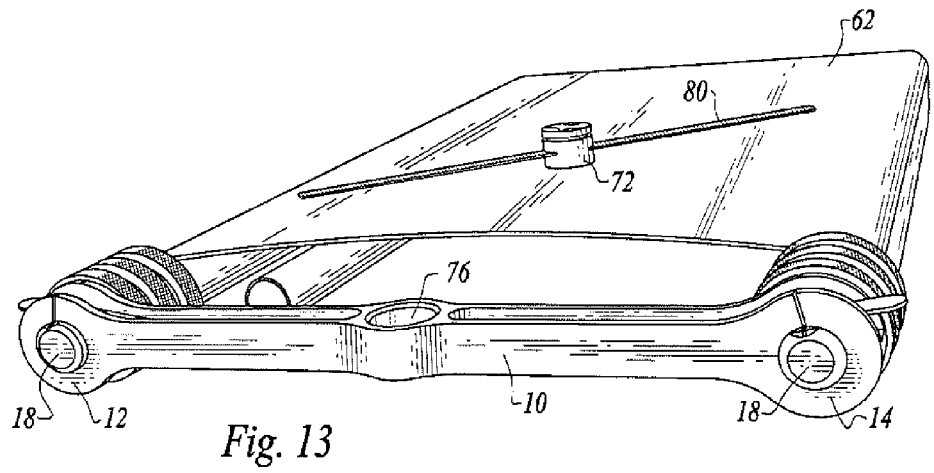
FIG. 13 is a perspective view illustrating an aeronautical chart supported by the map supports of the apparatus and a magnetic positioner component with scale/ruler positioned on the aeronautical chart.
Figure 15:
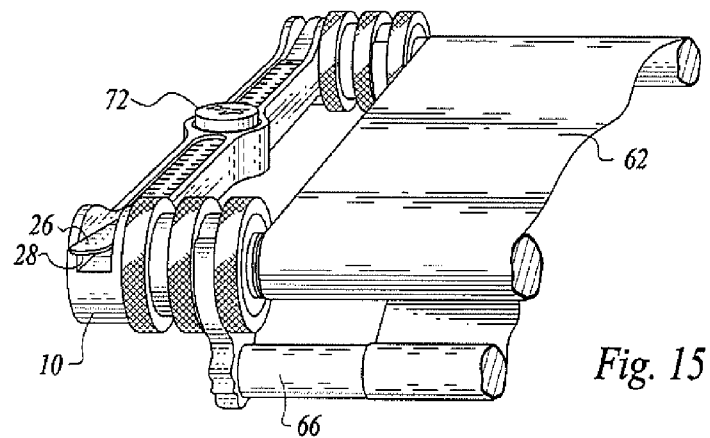
FIG. 15 is a perspective view illustrating the clips attached to the map supports and utilized to keep the aeronautical chart folded.

An aeronautical chart or other map is connected to the map supports 16 by adhesive coated connector elements 60 which may be pre-cut, transparent, sticky (one side) and very flexible plastic. Off the shelf transparent tape can also be used as an option by the user. FIGS. 13 and 15 show a paper aeronautical chart 62 attached to the map supports and folded in half over the distal ends of the flexible elastic support rods 40 of the map supports, the distal ends 20 being curved to reduce wear of the chart when it is bent over the end of the rod. In use, the chart or other map being held by the map supports is scrolled when desired by unwinding from one of the support rods while winding on the other. The chart can only be scrolled when the paper is straight out (not bent and doubled over). The flexible plastic support rods aid in tensioning the chart and locking it into position so that it doesn't freely unwind. If the user manually overtightens the chart or map, the support rods will flex (as shown in FIG. 10) to reduce pressure on the spindle mechanism at the proximal end of the map supports to prevent excessive wear at that location at the knob locations.

Figure 14:
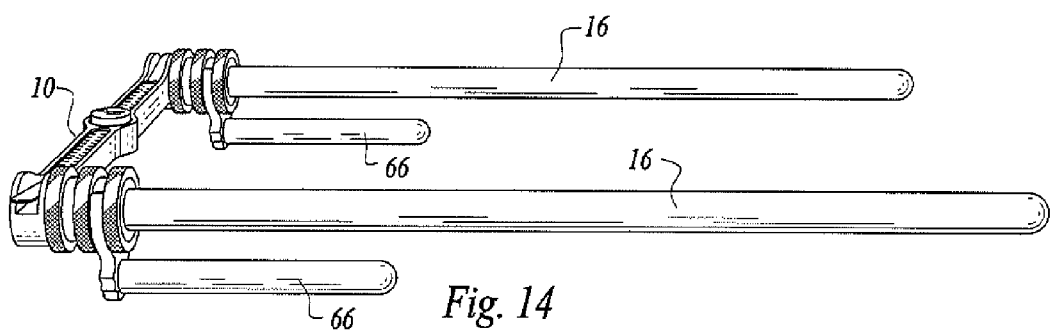
FIG. 14 is a perspective view illustrating clips attached to the map supports.

FIGS. 14 and 15 disclose clips 66 which are attached to the map supports 16 and are used to keep the chart folded over the end of the support rod. When the chart is folded over the distal ends of the support rods, the pressure at the bend in the paper wants to straighten the chart. The clips 66 prevent the chart from straightening. The clips can be used on each side of the apparatus. One, or two at a time, can be used effectively.

The apparatus includes a magnetic positioner magnetically releasably connected to the elongated base member 10 and selectively manually removable therefrom to be utilized as a locator member on an aeronautical chart or other map held by and extending between the map supports.

The magnetic positioner includes a magnetic positioner component 72 and a magnetic positioner component 74. The magnetic positioner component 72 is for positioning on a surface of an aeronautical chart or other map and the magnetic positioner component 74 is for positioning on an opposed surface of the aeronautical chart or other map and magnetically attached to magnetic positioner component 72. The magnetic positioner components 72, 74 are jointly slidable relative to the aeronautical chart or other map. FIG. 13 shows the magnetic positioner component 72 on aeronautical chart 62, positioner component 74 being hidden from view. The positioner is slid along the chart or map as needed to keep track of position or location as one flies or drives.

Figure 3:
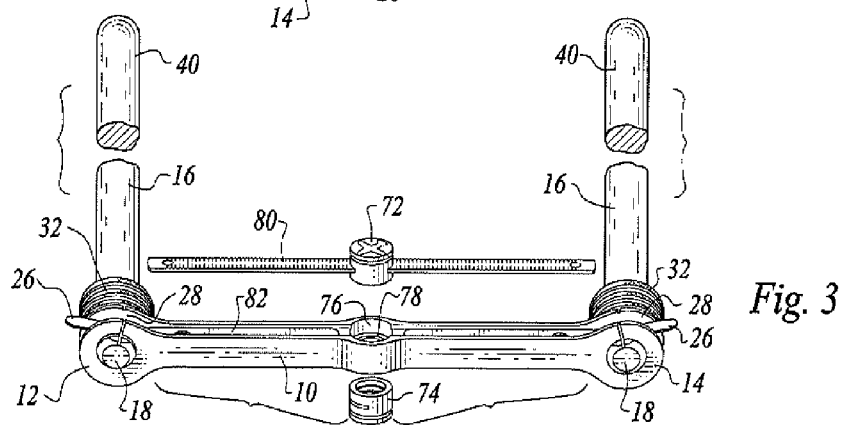
FIG. 3 is an exploded, perspective view illustrating the components of the apparatus shown in FIG. 1.

The elongated base member 10 defines sockets for receiving the magnetic positioner components 72, 74 when they are separated. The socket 76 for receiving positioner component 72 is shown in FIG. 3, a similar socket (not shown) is located at the bottom of the base member for receiving positioner component 74. The sockets are separated by a pressed magnetic steel part 78 which is part of the base member 10 and will maintain the lower magnetic positioner component 74 attached to the base member to prevent it from free-falling when the upper magnetic positioner component is removed.

Figure 12:
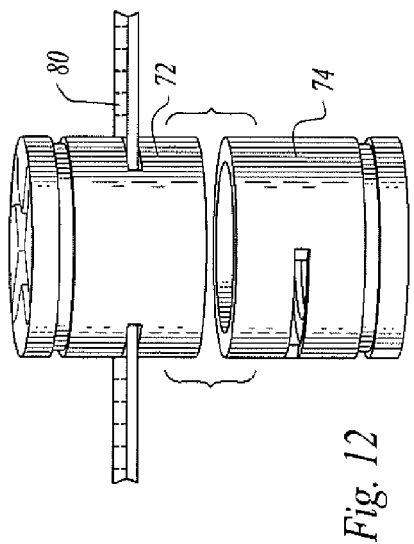
FIG. 12 is an elevational, perspective view illustrating two separated components of the magnetic positioner of the apparatus, the uppermost component supporting the scale/ruler.
Figure 11:
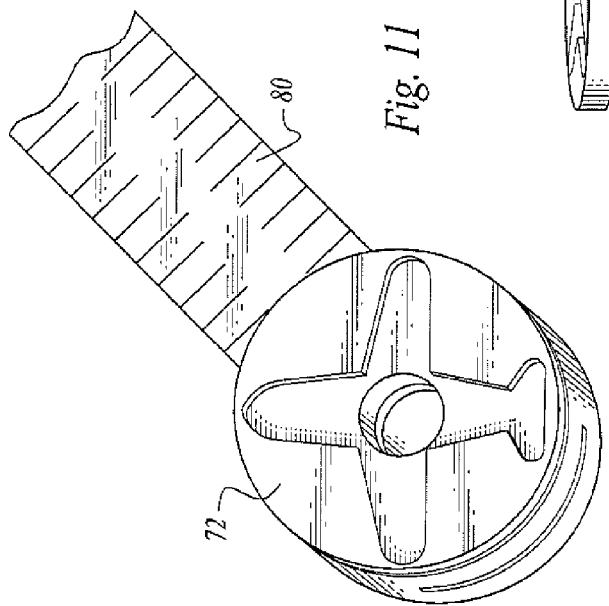
FIG. 11 is an enlarged, top, perspective view illustrating a magnetic positioner component and a portion of a scale/ruler of the apparatus.

A scale/ruler 80 (formed of steel and magnetic) passes through a slit in positioner component 72 to releasably connect the scale/ruler to that positioner component. The scale/ruler can be slid relative to the positioner component 72 or removed therefrom altogether, if desired. FIG. 12 shows the scale/ruler extending completely through positioner component 72 and FIG. 11 shows the scale/ruler partially inserted. When the scale/ruler is held by the positioner component 72 and is in the position shown in FIG. 3, the positioner component 72 may be placed into socket 76 with the scale/ruler positioned in an elongated recess 82 formed by the base member, portions of the recess located at opposite sides of the socket 76.

FIG. 13 shows the combined positioner component 72 and scale/ruler 80 deployed on the aeronautical chart 62. However, the scale/ruler may be completely removed from the positioner component 72 and deployed separately. If desired, the scale/ruler may be positioned on the chart or map with a portion thereof located between the two magnetic positioner components 72, 74 and magnetically attracted thereto to maintain the scale/ruler fixed in a desired position on the aeronautical chart or other map. The scale/ruler will also remain magnetically connected to positioner components 72, 74 when they are slid relative to the aeronautical chart or other map.

At least a portion of the outer surface of the base member is bead blasted or otherwise treated to allow a user to denote by pencil or other writing instrument information about the aeronautical chart or other map in use.

The invention claimed is:

1. Apparatus for holding and displaying an aeronautical chart or other type of map, said apparatus comprising, in combination:
an elongated base member having spaced first and second base member ends, each of said first and second base member ends defining a hole;
a double-ended, elongated first map support having a proximal end and a free distal end, the proximal end of said first map support positioned in the hole defined by said first base member end, said first map support extending away from said base member and the free distal end thereof spaced from said base member, and said first map support rotatable relative to said base member;
first retainer structure for releasably retaining the proximal end of said first map support in the hole defined by said first base member end;
a double-ended, elongated second map support member having a proximal end and a free distal end, the proximal end of said second map support positioned in the hole defined by the second base member end, said second map support extending away from said base member and the free distal end thereof spaced from said base member, and said second map support rotatable relative to said base member;
second retainer structure for releasably retaining the proximal end of said second map support in the hole defined by said second base member end, said first and second support members being substantially parallel and independently manually rotatable; and
brake structure for resisting manual rotation of said first and second map supports, said brake structure comprising flexible springs located at and connected to said first and second base member ends frictionally engageable with said first and second map supports to resist rotation of said first and second map supports, said flexible springs additionally comprising said first and second retainer structure for releasably retaining the proximal ends of said first and second map supports in the holes defined by said first and second base member ends, and said flexible springs comprising tension springs having flat surfaces bearing against outer peripheral surfaces of a said map supports.

2. The apparatus according to claim 1 wherein said map supports include spindle end portions at the proximal ends thereof and wherein said spindle end portions project into said holes and have peripherally extending channels receiving said tension springs, said spindle end portions having a plurality of flat peripheral surfaces at said channels engageable by said tension springs.

3. The apparatus according to claim 2 wherein said proximal ends of said support members are located adjacent to said spindle end portions and have a flat area formed thereby enabling said proximal ends to slide past said tension springs when aligned therewith to remove said map supports from said base member or attach said map supports to said base member.

4. The apparatus according to claim 3 wherein said base member ends and the distal ends of said map supports have alignment marks indicating when flat areas of the spindle end portions are aligned with said tension springs.

5. The apparatus according to claim 1 wherein said first and second base member ends define open spaces accommodating said tension springs and wherein said tension springs are manually accessible to manually disengage said tension springs from the outer peripheral surfaces of said map supports.

6. The apparatus according to claim 5 wherein said tension springs are attached to said base member ends by screws, enabling said tension springs to be removed from said spaces for replacement or reversal and reattachment.

7. The apparatus according to claim 1 additionally comprising a magnetic positioner magnetically releasably connected to said elongated base member and selectively manually removable therefrom to be utilized as a locator member on a aeronautical chart or other map held by and extending between said map supports.

8. The apparatus according to claim 7 wherein said magnetic positioner includes first and second magnetic positioner components, the first magnetic positioner component for positioning on a surface of an aeronautical chart or other map and the second magnetic positioner component for positioning on an opposed surface of the aeronautical chart or other map and magnetically attached to the first magnetic positioner component and jointly slidable therewith relative to the aeronautical chart or other map.

9. The apparatus according to claim 8 wherein said elongated base member defines sockets for receiving said first and second magnetic positioner components when not in use.

10. The apparatus according to claim 9 additionally comprising a scale or a ruler releasably connected to said first magnetic positioner component.

11. The apparatus according to claim 10 wherein said scale or ruler is magnetically attachable to said second magnetic positioner whereby said magnetic positioner may be employed to either move said scale or ruler relative to an aeronautical chart or other map or maintain said scale or ruler fixed in a desired position on the aeronautical chart or other map.

12. The apparatus according to claim 10 wherein said elongated base member forms a recess for accommodating said scale or ruler.

13. The apparatus according to claim 1 additionally including a plurality of adhesive coated connector elements attached to said first and second map supports for releasably securing an aeronautical chart or other map to said map supports.

14. The apparatus according to claim 1 additionally comprising manually engageable knobs connected to said map supports for manually rotating said map supports.

15. The apparatus according to claim 1 wherein said at least a portion of the outer surface of said base member allows notations to be made thereon by a writing instrument.

16. The apparatus according to claim 1 wherein said map supports are flexible plastic support rods which aid in tensioning the aeronautical chart or other type of map extending therebetween.

17. The apparatus according to claim 1 additionally including at least one clip to engage and hold a folded over portion of the aeronautical chart or other map.

* * * * *